United States Patent
Bulger

(10) Patent No.: US 6,824,583 B2
(45) Date of Patent: Nov. 30, 2004

(54) VELOCITY STACK AIR SYSTEM FOR MOTORCYCLES

(75) Inventor: George F. Bulger, 45 Manchester Rd., Eastchester, NY (US) 10709

(73) Assignee: George F. Bulger, Eastchester, NY (US)

( * ) Notice: Subject to any disclaimer, the term of this patent is extended or adjusted under 35 U.S.C. 154(b) by 0 days.

(21) Appl. No.: 10/353,893

(22) Filed: Jan. 29, 2003

(65) Prior Publication Data

US 2003/0159413 A1 Aug. 28, 2003

Related U.S. Application Data

(60) Provisional application No. 60/352,919, filed on Jan. 29, 2002.

(51) Int. Cl.[7] .......................... B01D 29/05; B01D 46/10
(52) U.S. Cl. .......................... 55/385.3; 55/492; 55/495; 55/505; 55/511; 55/DIG. 28; 123/198 E; 261/DIG. 67
(58) Field of Search .......................... 55/385.1, 385.3, 55/490, 492, 495, 510, 502–505, 511, 525, DIG. 28; 123/198 D, 198 E, 518–520; 261/DIG. 67

(56) References Cited

U.S. PATENT DOCUMENTS

| | | | | |
|---|---|---|---|---|
| 767,859 A | * | 8/1904 | Ballance et al. ............... 55/503 |
| 1,839,379 A | * | 1/1932 | Downing ...................... 55/498 |
| 2,331,393 A | * | 10/1943 | Hall ...................... 137/614.17 |
| 3,552,103 A | * | 1/1971 | Smith ........................... 55/486 |
| 3,960,133 A | * | 6/1976 | Donovan ................ 123/198 R |
| 4,276,067 A | * | 6/1981 | Lindman ..................... 55/337 |
| 4,280,968 A | * | 7/1981 | Smeets ........................ 261/16 |
| 4,509,613 A | * | 4/1985 | Yamaguchi ................. 180/219 |
| 4,592,316 A | * | 6/1986 | Shiratsuchi et al. .... 123/195 C |
| 4,704,143 A | * | 11/1987 | Percy .......................... 96/421 |
| 5,106,397 A | * | 4/1992 | Jaroszczyk et al. ........... 96/388 |
| 5,284,586 A | * | 2/1994 | DeSalvo ..................... 210/448 |
| 5,545,242 A | * | 8/1996 | Whitlock et al. ............. 55/502 |
| 5,632,793 A | * | 5/1997 | Haggard ..................... 55/498 |
| 5,723,047 A | * | 3/1998 | Turnbull ..................... 210/445 |
| 5,868,808 A | * | 2/1999 | Henderson ................... 55/336 |
| 5,888,260 A | * | 3/1999 | Sica ............................ 55/331 |
| 5,891,207 A | * | 4/1999 | Katta ........................ 55/385.3 |
| 5,912,370 A | * | 6/1999 | McConkey ................ 55/385.3 |
| 6,221,122 B1 | * | 4/2001 | Gieseke et al. ............... 55/500 |
| 6,231,630 B1 | * | 5/2001 | Ernst et al. ................ 55/385.3 |
| 6,287,354 B1 | * | 9/2001 | Nozaki ...................... 55/385.3 |
| 6,306,190 B1 | * | 10/2001 | Tsuruta et al. ............. 55/385.3 |
| 6,325,169 B1 | * | 12/2001 | Tateshima et al. .......... 180/219 |
| 6,478,105 B2 | * | 11/2002 | Okuma ....................... 180/219 |
| 2002/0020156 A1 | * | 2/2002 | Goerg ........................ 55/385.3 |
| 2003/0089233 A1 | * | 5/2003 | Boria ........................... 95/273 |

FOREIGN PATENT DOCUMENTS

EP  0164956 A1 * 12/1985

* cited by examiner

Primary Examiner—Robert H. Spitzer

(57) ABSTRACT

A velocity air stack for motorcycles in conjunction with their attachment to carburetors. Also disclosed is an internal breather support for motorcycle carburetors which is operable in conjunction with or without the velocity air stack.

13 Claims, 2 Drawing Sheets

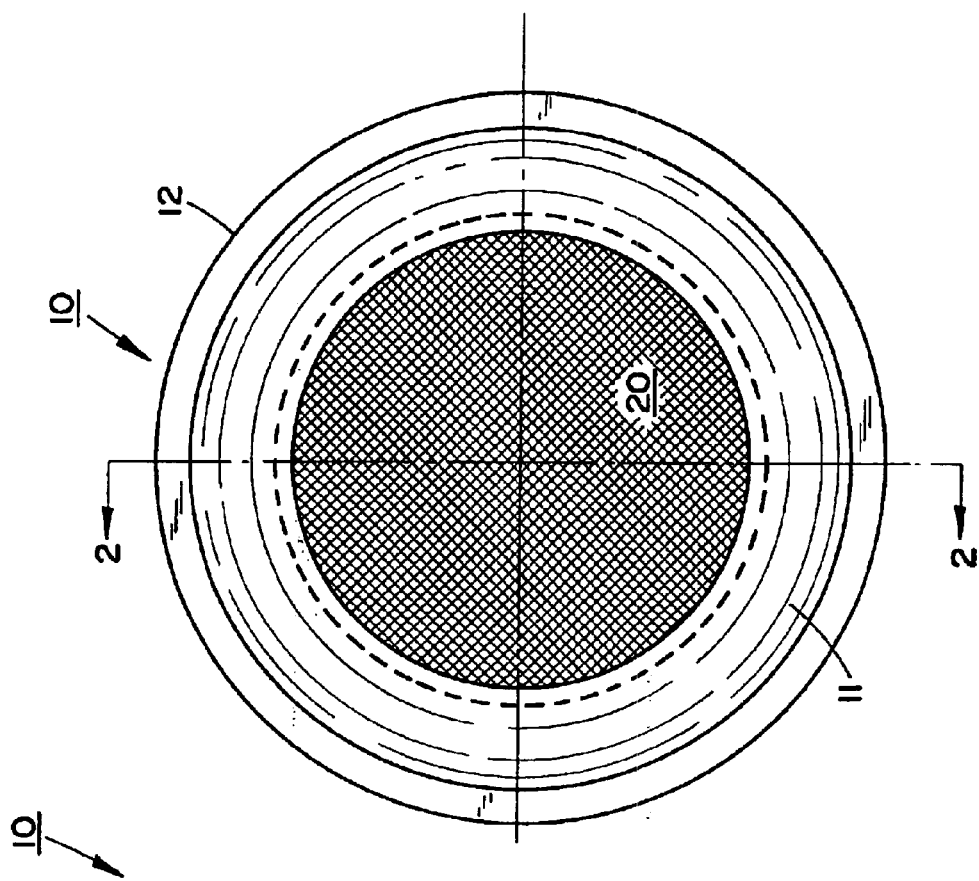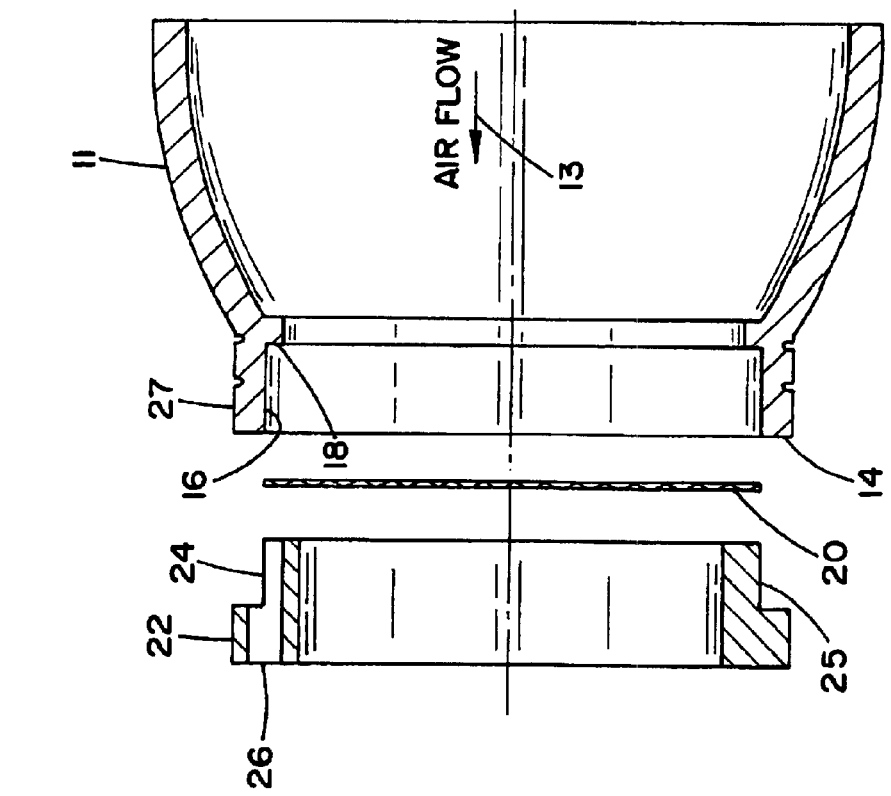

US 6,824,583 B2

VELOCITY STACK AIR SYSTEM FOR MOTORCYCLES

CROSS-REFERENCE TO RELATED APPLICATION

This application claims the benefit of Provisional U.S. Patent Application No. 60/352,919; filed on Jan. 29, 2002.

BACKGROUND OF THE INVENTION

1. Field of the Invention

The present invention relates to a velocity air stack for motorcycles in conjunction with their attachment to carburetors. Moreover, the invention is directed to an internal breather support for motorcycle carburetors.

With regard to diverse types of combustion engine-powered motorcycles, the carburetors thereof are generally equipped with velocity air stacks, the latter of which may comprise cylindrical or funnel shaped components, having the outer facing ends of which designed to receive an airflow leading to the carburetor. Attached to the outer airflow-receiving ends of the velocity airstacks in accordance with current usual kinds of constructions are filter-type membranes which inhibit the ingress of impurities or dirt into the carburetor system, such potential ingress being caused by the operation of the motorcycle during which deleterious quantities of dust and other particular contaminants may be sucked into the velocity air stack or air inlet system of the motorcycle, possibly resulting in a shutdown of its functioning and potential of damage to or destruction of the carburetor components.

2. Discussion of the Prior Art

Although these velocity stack air systems are currently widely employed in the therein installed motorcycle industry, the filters, which are used to prevent the inlet of impurities and contaminants, may be subject to being torn off or lost when mounted at the inlet end of the velocity air stacks.

SUMMARY OF THE INVENTION

Accordingly, in order to obviate the shortcomings encountered in the present state of this technology, pursuant to the present invention, there is provided a novel and improved velocity air stack for the air systems of motorcycle carburetors in which a filter constituted of a fine mesh construction and consisting of stainless steel is mounted in a region by being clamped between the discharge end of a generally preferably frusto-conically shaped velocity air stack and a mounting ring which is adapted to attach the entire arrangement to the motorcycle carburetor system.

Pursuant to another inventive feature of the present invention, there is provided an internal breather support for motorcycle carburetors which are adapted to be attached to the velocity air stack. The breather support as disclosed herein comprises radially extending lug members which are preferably in the shape of so-called "rabbit ears", and which may be attached to the velocity air stack so as to fixedly clamp the filter therebetween. The inventive internal breather support for motorcycle carburetors can be mounted so as to be selectively used with or without the velocity air stack as described herein; in effect, as an independent structure.

Moreover, the internal air screen of the velocity stack may also be applicable without the complete unit, or by itself, when mounted in any particular air inlet system for motorcycle carburetors of the most diverse types.

Accordingly, it is an object of the present invention to provide a novel and inventive velocity air stack which can be utilized in conjunction with the carburetor systems of internal combustion-powered vehicles, such as motorcycles or the like.

Another object of the present invention resides in the provision of a novel and inventive internal breather support for the carburetor systems of internal combustion-powered vehicles, such as motorcycles or the like.

BRIEF DESCRIPTION OF THE ACCOMPANYING DRAWINGS

Reference may now be made to the following detailed description of preferred embodiments of the invention; wherein:

FIG. 1 illustrates a front view of the velocity air stack for motorcycles pursuant to the invention;

FIG. 2 illustrates a longitudinal exploded sectional view, taken along line 2—2 in FIG. 1;

DETAILED DESCRIPTION OF PREFERRED EMBODIMENTS

Figure 3:
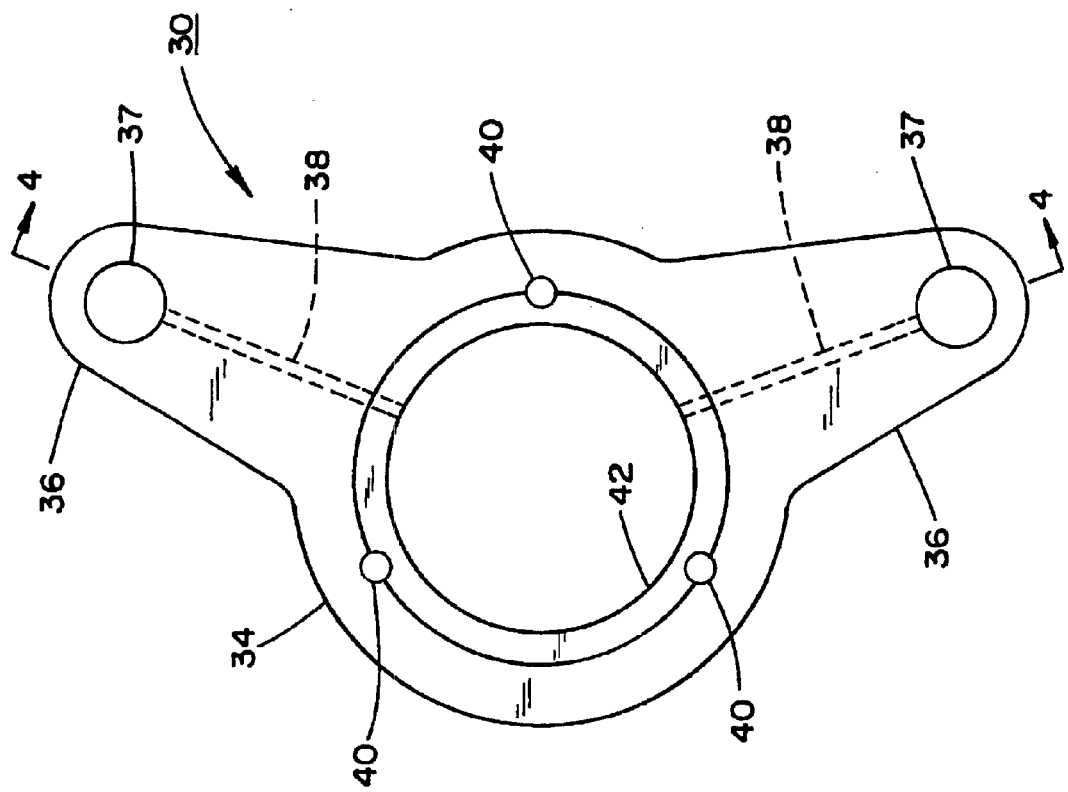
FIG. 3 illustrates a front view of an internal breather support for motorcycle carburetors, which can be employed either with or without the velocity air stack of FIGS. 2 and 3.

Referring specifically to FIGS. 1 and 2, there is disclosed a velocity air stack 10 for preferably the carburetor systems of motorcycles, comprising member 11 in the shape of a frusto-conical cylindrical configuration, wherein the member 11 is preferably constituted of stainless steel. The larger external diameter 12 of the member 11 forms the air inlet 13 leading towards the carburetor (not shown) to which the entire velocity air stack 10 may be either directly or indirectly attached.

At its smaller diameter end 14, the frusto-conical member 11 is provided with an internal screwthread 16, and a shoulder 18 of a reduced diameter against which there may be supported a disk-shaped fine-meshed filter 20, preferably of stainless steel or corrosion-resistant material, which is designed to keep out impurities, dirt and contaminants tending to enter the velocity air stack through the air inlet 13, and leading to the carburetor.

The filter 20 is clampedly retained in place by means of a flange-like ring member 22, the latter of which possesses an external screwthread 24 on a smaller sized diameter 25, which mates with the internal screwthread 16 of a cylindrical extension 27 formed by the smaller end 14 of the frusto-conical member 11, and when threaded together, the filter 20 is clamped against the shoulder 18 by means of the interengagement of the internal screwthread 16 of the cylindrical extension member 27 and the external screwthread 24 on the flange-like ring member 22.

A number of radially spaced bolt holes 26 may extend axially about the periphery of ring member 22, which are adapted to be engaged by suitable bolts (not shown) leading to a mounting arrangement (not shown) for a carburetor. Also, suitable slots may be provided for the venting of air.

Figure 4:
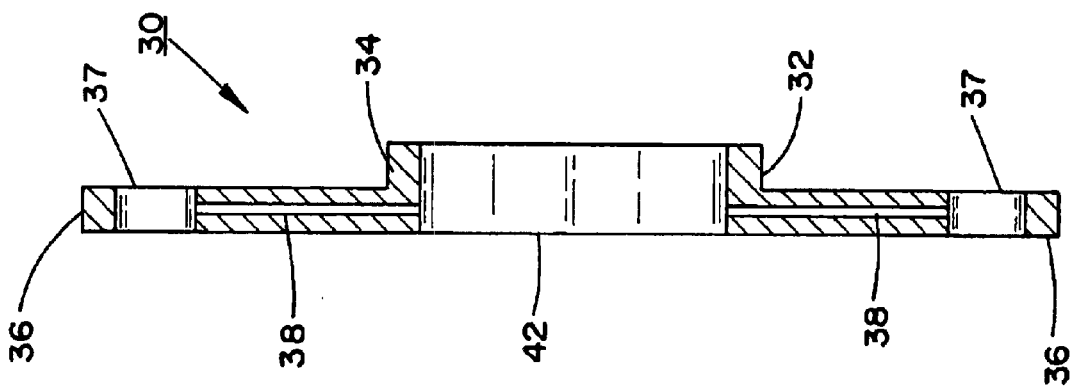
FIG. 4 illustrates a sectional view, taken along line 4—4 in FIG. 3.

Instead of the above-described ring member 22, there may be provided a somewhat similar ring-shaped, plate-like structure 30, as shown in FIGS. 3 and 4, wherein there is again provided an external screwthreaded surface 32 on a cylindrical boss-like member 34. At one end of the member

34 are a pair of radially extending lugs 36, so-called "rabbit ears", which include radially outer, axial holes 37 for mounting hollow bolts forming connections with radial elongated apertures 38 so as to constitute an internal breather support for a motorcycle carburetor, and in which the apertures 38 form vents or passages to allow motor air pressure to escape. All of the components may, of course, be preferably constituted of stainless steel or the like in order to prevent or retard corrosion, and to impart a lengthy service life to the entire structure.

The internal breather support 30 for a motorcycle carburetor (not shown), as illustrated in FIGS. 3 and 4 may be optionally used in conjunction with the velocity air stack 10 of FIGS. 1 and 2, and also may be provided without the screwthreading on the "rabbit ears" or lugs so as to be able to utilize the latter for the attachment of other types of air cleaners.

The particular bolt patterns illustrated, in effect, the three bolt holes 40 extending about the central aperture 42 which may mount the filter 20, may be of different sizes and configurations, inasmuch as various motorcycles may at times utilize different types of carburetors with different kinds of bolt patterns. Consequently, when manufacturing the foregoing structures, these may be customized to particular types of carburetors adapted for use with different motorcycles and models thereof.

From the foregoing, it clearly appears that the inventive construction provides for a unique velocity air stack arrangement 10 for motorcycles, and also a unique internal air breather support 30, the latter of which may be selectively optionally utilized in conjunction with the velocity air stack, and has the internal air filter 20 designed also for use either with or without the complete velocity air stack.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A velocity air stack for connection to carburetor systems of internal-combustion powered vehicles, comprising a generally cylindrical member having an air inlet end and an air discharge end;
    an air filter for the removal of contaminant particles entrained in the airflow being arranged proximate the air discharge end of said cylindrical member and;
    a ring member which is mountable to the air discharge end of said cylindrical member clampedly retaining said filter between said air discharge end and said ring member, said cylindrical member comprising a frusto-conical portion having the larger diameter end forming said air inlet end and the smaller diameter end retaining said air filter in clamped engagement with said ring member.

2. A velocity air stack as claimed in claim 1, wherein said cylindrical member, said air filter and said ring member are each constituted of a corrosion-resistant material.

3. A velocity air stack as claimed in claim 2, wherein said corrosion-resistant material comprises stainless steel.

4. A velocity air stack as claimed in claim 1, wherein said ring member includes circumferentially spaced, axially extending bolt holes to facilitate the attachment of said velocity air stack to the carburetor system of said vehicle.

5. A velocity air stack as claimed in claim 1, wherein said ring member comprises an internal breather support structure for a carburetor, including venting apertures to enable engine air pressure from said vehicle to be vented to atmosphere.

6. A velocity air stack as claimed in claim 5, wherein said internal breathers support structure comprises a plate-shaped member including a plurality of radially extending lugs having air passageways formed by said venting apertures.

7. A velocity air stack as claimed in claim 1, wherein said cylindrical member sand said ring member are fastened together through cooperating screwthreaded surface positions.

8. An internal breather support for connection to a carburetor system of internal-combustion powered vehicles, comprising a plate-shaped structure including venting apertures for enabling engine air pressure from said vehicle to be vented to atmosphere.

9. An internal breather support as claimed in claim 8, wherein said plate-shaped structure comprises a ring portion having radially extending lugs incorporating airflow passageways constituted by said venting apertures; and holes formed in the outer ends of said lugs for receiving hollow bolts facilitating flow of air therethrough while providing connections with a carburetor system.

10. An internal breather support as claimed 8, wherein said support is connectable to an air discharge end of a velocity air stack for a carburetor system.

11. An internal breather support as claimed in claim 8, wherein said breather support is constituted of a corrosion-resistant material.

12. An internal breather support as claimed in claim 11, wherein said corrosion-resistant material comprises stainless steel.

13. An internal breather support as claimed in claim 8, wherein said plate-shaped structure comprises connecting means for mounting an air filter.

\* \* \* \* \*